United States Patent
Zheng, Jr. et al.

(10) Patent No.: US 12,443,832 B1
(45) Date of Patent: Oct. 14, 2025

(54) NEURAL NETWORK ARCHITECTURE WITH HIGH BANDWIDTH MEMORY (HBM)

(71) Applicant: Xilinx, Inc., San Jose, CA (US)

(72) Inventors: Xianpei Zheng, Jr., Beijing (CN);
Zhongmin Chen, Beijing (CN);
Lingzhi Sui, Beijing (CN); Pengbo Zheng, Beijing (CN); Xiang Feng, Beijing (CN); Chong Sun, Beijing (CN); Yu Zhang, Beijing (CN);
Enshan Yang, Beijing (CN)

(73) Assignee: XILINX, INC., San Jose, CA (US)

( * ) Notice: Subject to any disclaimer, the term of this patent is extended or adjusted under 35 U.S.C. 154(b) by 1064 days.

(21) Appl. No.: 17/245,339

(22) Filed: Apr. 30, 2021

(51) Int. Cl.
*G06N 3/063* (2023.01)
*G06F 13/40* (2006.01)

(52) U.S. Cl.
CPC ......... *G06N 3/063* (2013.01); *G06F 13/4022* (2013.01)

(58) Field of Classification Search
CPC .......................... G06N 3/063; G06F 13/4022
See application file for complete search history.

(56) References Cited

U.S. PATENT DOCUMENTS

| | | | |
|---|---|---|---|
| 10,282,659 B2 | 5/2019 | Fang et al. | |
| 10,732,943 B2 | 8/2020 | Sun et al. | |
| 10,824,939 B2 | 11/2020 | Fang et al. | |
| 10,902,315 B2 | 1/2021 | Fang et al. | |
| 11,093,225 B2 | 8/2021 | Yu et al. | |
| 11,514,324 B2 | 11/2022 | Sui et al. | |
| 11,658,156 B2 * | 5/2023 | Keeth | H01L 23/481 257/48 |
| 2001/0049777 A1 * | 12/2001 | Tomioka | G11B 27/36 |
| 2014/0115224 A1 * | 4/2014 | Sanghai | G06F 9/3824 710/317 |
| 2019/0187898 A1 * | 6/2019 | Gu | G06N 3/08 |

FOREIGN PATENT DOCUMENTS

| | | | | |
|---|---|---|---|---|
| CN | 110766127 A | * | 2/2020 | ........... G06N 3/0454 |
| WO | WO-2018121118 A1 | * | 7/2018 | ........... G06F 1/3287 |

OTHER PUBLICATIONS

"Pixel Format" section from "In-memory data formats", NVDLA Documentation, page seven of the printed webpage, accessed Nov. 8, 2019 at http://nvdla.org/hw/format.html#pixel-format. 25 pages.

* cited by examiner

*Primary Examiner* — Shahid K Khan
(74) *Attorney, Agent, or Firm* — Patterson + Sheridan, LLP

(57) ABSTRACT

A system includes a high bandwidth memory (HBM) and a convolutional neural network (CNN) engine. The HBM includes a virtual bank portion and a system memory portion. The virtual bank portion is configured to store a feature map data and the system memory portion is configured to support data exchanges with a host. The CNN engine includes a convolutional unit configured to execute convolutional layer instructions, a depthwise convolutional unit configured to execute depthwise layer instructions, and a first on-chip buffer. The first on-chip buffer is configured to receive and store the feature map data from the virtual bank portion or receive and store data results from the convolutional unit. The first on-chip buffer is further configured to send the feature map data or the data results from the convolutional unit to the depthwise convolutional unit for processing.

19 Claims, 7 Drawing Sheets

NEURAL NETWORK ARCHITECTURE WITH HIGH BANDWIDTH MEMORY (HBM)

TECHNICAL FIELD

The disclosure generally relates to a neural network and more particularly to a convolutional neural network with high bandwidth memory with reduced latency and improved memory access.

BACKGROUND

Typically, neural networks, e.g., convolutional neural networks (CNN) have large numbers of parameters and intermediate results that must be stored, e.g., in a double data rate (DDR) memory, on-chip memory, etc. Unfortunately, limited bandwidth of a DDR memory causes bottleneck issues and on-chip memories are too small to store all the data even though that they can provide high bandwidth and low latency. As such, a hybrid of DDR memory and on-chip memories are often used but unfortunately that requires data movement between a DDR memory and an on-chip memory which is not only costly to implement but that also have high latency. Some have used a high bandwidth memory (HBM) to address some of the above limitations. Although HBM can provide large storage with large bandwidth it is not as flexible, e.g., as a static random access memory (SRAM), when used with a programmable device such as a field programmable gate array (FPGA) because it is positioned on one side of the FPGA, the number of ports are limited because some ports are reserved, its latency is some fixed value that is typically higher than SRAMs, and its bandwidth is less than half of switch bandwidth.

Furthermore, the amount of data for neural networks such as CNNs is increasing while the latency requirement is decreasing. As such, some have proposed architectures that use fewer computations, e.g., using small convolutional kernels such as 1×1 or 3×3, without a noticeable drop in accuracy and some have replaced them with non-1×1 depthwise layers. Although depthwise layers decrease the computation, they unfortunately lead to hardware inefficiencies for process arrays, e.g., a convolutional array with 4 (height)×32 (input channel)×64 (output channel) parallelism may have only 1/(32×64) utilization.

SUMMARY

Accordingly, it is desirable to address capacity limitations for memories in neural networks while reducing latency and increasing bandwidth. Moreover, it is advantageous to decrease the computation and accelerate the depthwise layer processing with minimal impact on resource utilization. A new architecture is disclosed where an HBM is used to increase capacity and bandwidth. The feature map data is stored in dedicated virtual banks of the HBM while weight data, bias data, and instructions are stored on on-chip memory. As such, data movement between memory banks for the feature map data is eliminated, the limitations associated with number of ports is addressed, the latency is reduced, and the bandwidth is increased. Moreover, an on-chip buffer may be used to communicate data between a convolutional unit and a depthwise convolutional unit such that the cost associated with data movement to off-chip memory is saved. Accordingly, large neural network data can be processed with very low latency. Moreover, a dedicated depthwise engine is added with a few DSPs that provides a required computing power that matches the throughput of the convolutional unit.

In some embodiments, a system includes an HBM and a CNN engine. The HBM includes a virtual bank portion and a system memory portion. The virtual bank portion is configured to store a feature map data and the system memory portion is configured to support data exchanges with a host. The CNN engine includes a convolutional unit configured to execute convolutional layer instructions, a depthwise convolutional unit configured to execute depthwise layer instructions, and a first on-chip buffer. The first on-chip buffer is configured to receive and store the feature map data from the virtual bank portion or receive and store data results from the convolutional unit. The first on-chip buffer is further configured to send the feature map data or the data results from the convolutional unit to the depthwise convolutional unit for processing.

The virtual bank portion may include interleaved bank group organization. In some embodiments, a subset banks of the virtual bank portion have a corresponding Advanced Extensible Interface (AXI) ports and the subset banks of the virtual bank portion is dedicated to the convolutional unit. In some embodiments, a subset banks of the virtual bank portion have a corresponding Advanced Extensible Interface (AXI) ports and the subset banks of the virtual bank portion is dedicated to the depthwise convolutional unit. In some illustrative embodiments, a subset banks of the virtual bank portion have a corresponding Advanced Extensible Interface (AXI) ports and the subset banks of the virtual bank portion is dedicated to the first on-chip buffer.

In some embodiments, the system further includes a second on-chip buffer configured to store weights and bias data. Moreover, in one illustrative embodiment, the system includes an element/pooling layer unit configured to calculate element-wise layers and pooling layers. The element/pooling layer unit is connected to ports associated with a subset of banks of the virtual bank portion. The subset of banks for the element/pooling layer unit is in the middle of the virtual bank portion, according to some embodiments. It is appreciated that in some embodiments, the ports associated with the subset of banks for the element/pooling layer unit are Advanced Extensible Interface (AXI) ports and the subset of banks of the virtual bank portion is dedicated to the element/pooling layer unit.

In some embodiments, the convolutional unit includes a data fetch unit and a calculation unit. The data fetch unit receives instructions prior to the calculation unit.

It is appreciated that in some embodiments, the feature map data is arranged in channel dimension, width dimension, and height dimension in the virtual bank portion, and the convolutional unit is configured to calculate in channel dimension, width dimension, and height dimension order. According to some embodiments, a height dimension associated with the convolutional unit is the same as a height dimension associated with the depthwise convolutional unit and an output channel dimension associated with the convolutional unit is the same as an input/output dimension associated with the depthwise convolutional unit.

It is appreciated that parallelism between the convolutional unit and the depthwise convolutional unit is selected to match bandwidth of the HBM and further selected to match digital signal processing (DSP) resources. According to some embodiments, the first on-chip buffer is a dedicated buffer for supporting data transfer between the convolutional unit, the depthwise convolutional unit, and the virtual bank portion.

In some embodiments, a system includes an HBM a convolutional neural network (CNN) engine. The HBM includes a virtual bank portion and a system memory portion. The virtual bank portion is configured to store a feature map data and the system memory portion is configured to support data exchanges with a host. The CNN engine further includes a convolutional unit configured to execute convolutional layer instructions, a depthwise convolutional unit configured to execute depthwise layer instructions, and an on-chip buffer dedicated to support data transfer from the convolutional unit and the virtual bank portion to the depthwise convolutional unit. It is appreciated that the depthwise convolutional unit includes a controller, a reader, a processing engine, and a writer engine. The controller is configured to decode instructions into control parameters. The reader is configured to receive the control parameters, generate read address to fetch feature map data, generate read address to fetch weight data, and generate read address to fetch bias data. The processing engine is configured to perform depthwise calculations based on the received feature map data, the weight data, and the bias data. The writer engine is configured to receive the control parameters and data results from the processing engine and to generate write address for the HBM to write the data results.

It is appreciated that in some embodiments, the writer engine is further configured to output a signal to the controller when a buffer within the writer engine is about to overflow. According to some embodiments, the processing engine includes a plurality of cascaded digital signal processors, an adder, and a buffer. Each digital signal processor of the plurality of cascaded digital signal processors is configured to receive its respective weight data and further configured to receive the feature map data. Each digital signal processor is further configured to operate on the received feature map data based on its respective weight data and is further configured to output a result to a next digital signal processor until a last digital signal processor is reached where a partial result is generated. The adder is configured to receive the partial result and is further configured to receive a previously stored partial result on a prior iteration. The adder is configured to sum the previously stored partial result to the partial result. The buffer is connected to the adder and is configured to store a result of the sum from the adder and further configured to output the stored result to the adder for a next iteration. The data is iteratively processed until a complete result from the partial result is obtained.

It is appreciated that the system may further include another adder configured to receive the complete result and further configured to receive bias data. In some embodiments, the system may further include a nonlinear unit configured to perform nonlinear operations, e.g., relu, leaky relu, etc. It is appreciated that the processing engine is configured to perform calculation in width dimension, height dimension, and channel dimension order.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
FIG. 1 shows a block diagram depicting a neural network architecture, according to some examples.

Examples described herein relate to a neural network, e.g., CNN, and a computational architecture thereof. The illustrative embodiments of the neural network architecture address capacity limitations of memories in conventional neural networks while reducing latency and increasing bandwidth. The new architecture decreases the amount of computation and accelerates the depthwise layer processing with minimal impact on resource utilization. It is appreciated that the new architecture leverages the use of an HBM to increase capacity and bandwidth. HBM is a high-performance random access memory (RAM) instance for three-dimensional (3-D) stacked dynamic RAM (DRAM), which may be used in any of various suitable applications, such as high-performance graphics accelerators and network devices. In some embodiments, up to eight DRAM dies may be stacked, which may be interconnected by through-silicon vias (TSVs) and microbumps. It is appreciated that HBM devices may take advantage of stacked silicon interconnect (SSI) technology to connect DRAM to a programmable IC die (e.g., an FPGA die) eight to ten times denser and faster than traditional DRAM allows using traditional I/O connected to package pins over a printed circuit board (PCB). The feature map data is stored in dedicated virtual banks of the HBM while weight data, bias data, and instructions are stored on on-chip memory. As such, data movement between memory banks for the feature map data is eliminated, the limitations associated with number of ports is addressed, the latency is reduced, and the bandwidth is increased. It is further appreciated that an on-chip buffer is used to communicate data between a convolutional unit and a depthwise convolutional unit such that the cost associated with data movement to off-chip memory is saved and the convolutional unit and the depthwise convolutional unit work together in piping style without having to move the data to the HBM. Accordingly, large neural network data can be processed with very low latency. It is appreciated that a dedicated depthwise engine is used with a few DSPs that provides a required computing power that matches the throughput of the convolutional unit.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. For example, various methods according to some examples can include more or fewer operations, and the sequence of operations in various methods according to examples may be different than described herein. In addition, an illustrated example need not have all the aspects or advantages shown. An aspect or an advantage described in conjunction with a particular example is not necessarily limited to that example and can be practiced in any other examples even if not so illustrated or if not so explicitly described.

Some general concepts will first be described to clarify terms and nomenclature used throughout this description.

Referring now to FIG. 1, a block diagram depicting a neural network architecture, according to some examples is shown. A neural network, e.g., CNN, can be implemented on various devices, e.g., Application Specific Integrated Circuit (ASIC), an FPGA, a processor, etc. It is appreciated that the embodiments are described with respect to a CNN for illustrative purposes. However, the embodiments can similarly be applied to other neural networks. The neural network may include a neural network model 110 such as a CNN model, a neural network compiler 120, and a neural network accelerator 130. In some embodiments, the neural network model 110 is compiled by the neural network compiler 120 into instructions that drive the neural network accelerator 130. It is appreciated that the embodiments are directed to the operations and the architecture of the neural network accelerator 130 to process instructions and computations in an efficient, high bandwidth, and low latency manner.

Figure 2:
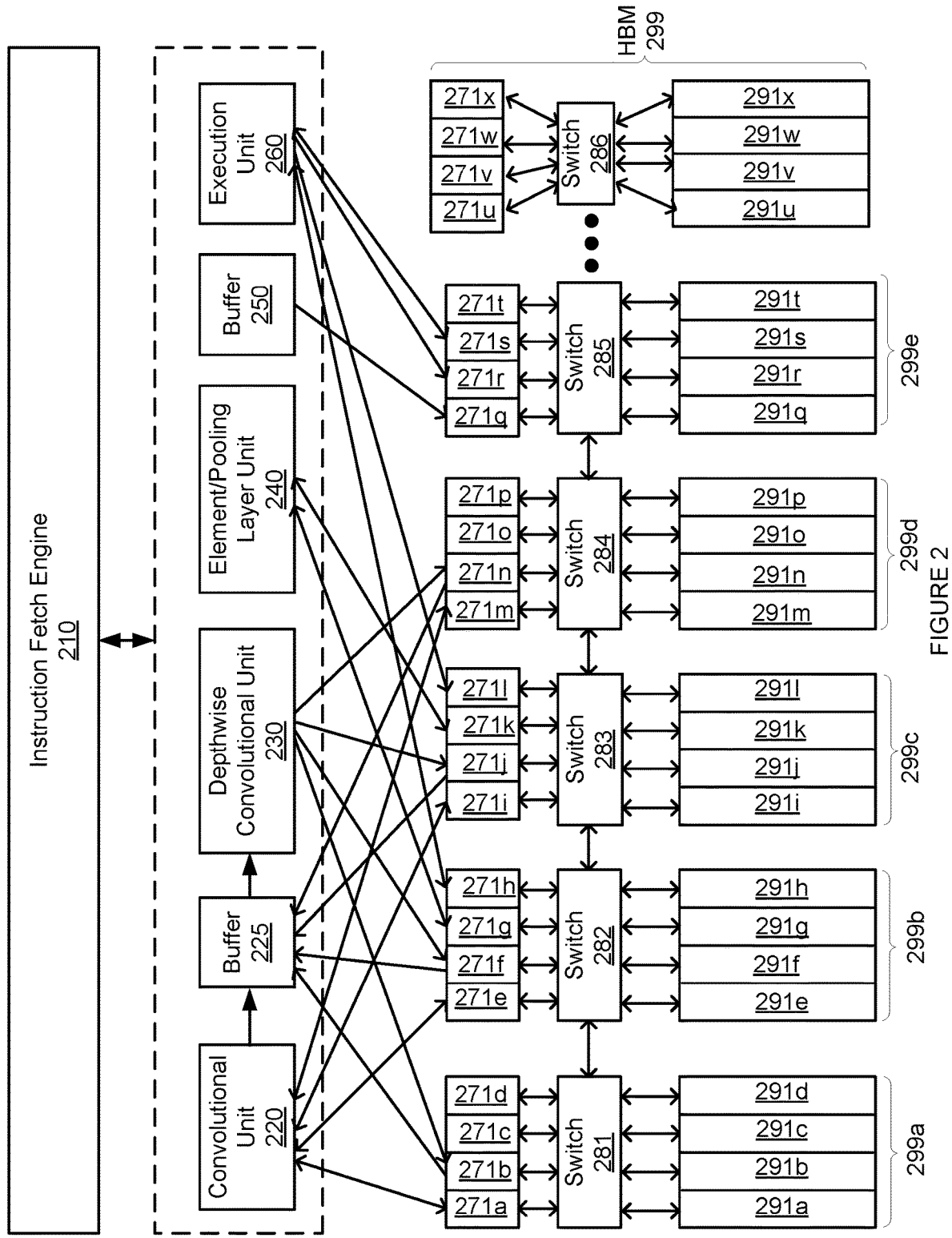
FIG. 2 shows a block diagram depicting a neural network accelerator, according to some embodiments.

Referring now to FIG. 2, a block diagram depicting a neural network accelerator, according to some embodiments, is shown. The accelerator includes an instruction fetch engine 210, a convolutional unit 220, buffer 225, a depthwise convolutional unit 230, an element/pooling layer unit 240, buffer 250, an execution unit 260, and an HBM 299. It is appreciated that the HBM 299 may include a plurality of groups/banks 291a, 291b, . . . , 291x that are coupled to switches 281, 282, . . . , 286, which are coupled to ports 271a, 271b, . . . , 271x. In some nonlimiting examples the convolutional unit 220 and the depthwise convolutional unit 230 are implemented in an FPGA. It is appreciated that in some other nonlimiting examples the convolutional unit 220 and the depthwise convolutional unit 230 are implemented in a processor or an ASIC.

It is appreciated that the groups/banks 291a, . . . , 291x are organized in an interleaved bank group fashion for each switch. For example, group/bank 291a may correspond to group 0 and bank 0, while group/bank 291b corresponds to group 1 bank 0, while group/bank 291c corresponds to group 2 bank 0, while group/bank 291d corresponds to group 3 bank 0 for their respective switch 281. It is appreciated that group/bank 291a may be assigned to port 271a, while group/bank 291b is assigned to port 271b, while group/bank 291c is assigned to port 271c, while group/bank 291d is assigned to port 271d. Similarly, group/bank 291e may correspond to group 0 and bank 1, while group/bank 291f corresponds to group 1 bank 1, while group/bank 291g corresponds to group 2 bank 1, while group/bank 291h corresponds to group 3 bank 1 for their respective switch 282. It is appreciated that group/bank 291e may be assigned to port 271e, while group/bank 291f is assigned to port 271f, while group/bank 291g is assigned to port 271g, while group/bank 291h is assigned to port 271h. Similarly, group/bank 291i may correspond to group 0 and bank 2, while group/bank 291j corresponds to group 1 bank 2, while group/bank 291k corresponds to group 2 bank 2, while group/bank 291l corresponds to group 3 bank 2 for their respective switch 283. It is appreciated that group/bank 291i may be assigned to port 271i, while group/bank 291j is assigned to port 271j, while group/bank 291k is assigned to port 271k, while group/bank 291l is assigned to port 271l. It is appreciated that the remainder of the HBM 299 may also be similarly structured.

According to some embodiments, the lower half of the HBM 299, e.g., bank group 299a, . . . , bank group 299d, are structured as virtual banks for the CNN engine and store feature map data. The interleaves structure for the bank and group organization of the virtual banks matches data access sequence in order to increase bandwidth while reducing latency. Accordingly, any of the CNN modules, e.g., convolutional unit 220, depthwise convolutional unit 230, element/pooling layer unit 240, etc. have direct AXI port access to read and write feature map data to and from the virtual banks.

It is appreciated that the upper half of the HBM 299, e.g., bank group 299e, etc., are designated as system memory for exchanging data with a host. Accordingly, modules that need access to system memory are provided direct AXI port access to the upper half of the HBM 299.

Since the layout architecture is described, the operation of the architecture is described next. The instruction fetch engine 210 is configured to fetch instructions from system memory, e.g., stored by the compiler 120, and to dispatch the fetched instruction to the appropriate unit for execution. It is appreciated that the system also includes buffers 225 and 250. Buffer 250 is an on-chip buffer that is configured to store weight and bias data information. In some embodiments, the buffer 250 is configured to store kernel parameters of convolutional unit 220 and the depthwise convolutional unit 230 as well as bias data for the convolutional unit 220 and the depthwise convolutional unit 230. In contrast, the buffer 225 is an on-chip buffer that is configured to store input feature map data of the depthwise convolutional unit 230 where they are direct output of the convolutional unit 220 or a direct read from the virtual banks. It is appreciated that since the feature map data is stored in the virtual banks, devices such as FPGAs, have enough on-chip Static Random Access Memory (SRAM) to keep all the weights and bias data in the on-chip buffer 250. The weights and bias data are preloaded onto the on-chip buffer 250, at start-up or at another time, and are therefore available in a very short amount of time and short latency with high bandwidth when needed in comparison to having to access them from system memory.

It is appreciated that the execution unit 260 may include a load and/or save unit. The execution unit 260 executing a load instruction may move weight and bias data from system memory to on-chip buffers, e.g., buffer 250. Furthermore, the execution unit 260 executing a load instruction may move feature map data from system memory to the virtual banks with the required format. In contrast, a save instruction being executed by the execution unit 260 may move the feature data maps from the virtual banks into the system memory.

The convolutional unit 220 is configured to execute convolutional instructions and it comprises a large DSP array. For example, the convolutional unit 220 may be 4×32×64 where its height dimension is 4, its input channel dimension is 32, and its output channel dimension is 64 that consumes about 4.8-5.3 TOps. In some embodiments, one DSP may handle two 8-bit×8-bit multiplication and therefore the height dimension of 4 can share 2 DSP chains. Also, in some embodiments, a DSP may operate in double frequency, two output dimensions can time share a single DSP chain. As such, (4/2)*32*(64/2) DSPs may be needed. It is appreciated that the parallelism is selected to match that of the HBM bandwidth and to maximize DSP resource utilization on the die, e.g., FPGA. The convolutional unit 220 may communicate data with the virtual banks, e.g., bank group 299*a*, . . . , 299*d*, through its dedicated AXI ports 271*a*, 271*e*, 271*i*, and 271*m* associated with group/bank 291*a*, 291*e*, 291*i*, and 291*m* respectively.

In contrast, the depthwise convolutional unit 230 is configured to execute depthwise instruction, as the convolutional unit. The depthwise convolutional unit 230 may include a small DSP array and it is responsible to perform all depthwise layer calculations. Since there is no DSP sharing on any dimension, the parallelism of the depthwise convolutional unit 230 for the example above is 4×64×3, where 4 is the height dimension, 64 is the input/output channel dimension, and 3 is the width dimension, thereby requiring 768 DSP, in this example. The depthwise convolutional unit 230 may transmit processed data to the virtual banks, e.g., bank group 299*a*, . . . , 299*d*, through its dedicated AXI ports 271*b*, 271*f*, 271*j*, and 271*n* associated with group/bank 291*b*, 291*f*, 291*j*, and 291*n* respectively.

It is appreciated that the on-chip buffer 225 may be used to facilitate data transfer between the convolutional unit 220 and the depthwise convolutional unit 230 in a piping style. In general, the convolutional unit 220 and the depthwise convolutional unit 230 are involved in many back-to-back calculations. As such, a dedicated on-chip buffer 225 can be used where the results from the convolutional unit 220 are written to and are directly accessible by the depthwise convolutional unit 230 as soon as it is ready, thereby eliminating data movement to other memory components such as a DDR. As such, performing a two layer calculation needs to read one layer's input feature map data from the virtual memory and write one layer result's result to the virtual memory instead of twice read and twice write.

The element/pooling layer unit 240 is configured to calculate element-wise layers and pooling layers for the neural network. The element/pooling layer unit 240 may communicate data with the virtual banks, e.g., bank group 299*b* and 299*c* through its dedicated AXI ports 271*g* and 271*k* associated with group/bank 291*g* and 291*k* respectively.

It is appreciated that the convolutional unit 220 is sensitive to lateral access. As such, lateral access from the convolutional unit 220 is avoided by structuring each virtual bank group into four sub-blocks. For example bank group 299*a* includes four sub-blocks therefore matching the height dimension of the convolutional unit 220. In some embodiments, each AXI port, e.g., port 271*a*, 271*b*, . . . , may be 256 bits wide, thus each entry into the virtual memory is also 256 bits wide. In this illustrative embodiment, since the feature map data is 8 bit fix-point, 32 pixels can be placed in one entry (i.e. load) and 32 pixels can be read out (i.e. save) by one access. Thus, the convolutional unit 220 achieves parallelism on its input channel because its input channel dimension is 32 in this illustrative embodiment. It is appreciated that in order to utilize the lower half of the HBM 299, four bank groups may be used and dedicated as virtual banks while lateral access is avoided by switching bank group. It is appreciated that the virtual bank organization as described, for a 1×1 convolutional kernel size, removes all user interconnection outside of the HBM 299 while the convolutional unit 220 does not trigger any lateral access. It is further appreciated that the virtual bank organization as described, for a 3×3 convolutional kernel size, only requires a 4×4 switch outside of the HBM 299 while the convolutional unit 229 does not trigger any lateral access.

It is appreciated that in order to reduce HBM access latency further, the AXI burst length of greater than 2 is used to enable HBM master modules to issue as much transaction as the HBM 299 can accept. Furthermore, it is appreciated that the addresses of successive transactions are organized in a linear fashion. For example, the feature map data arrangement in the virtual banks, e.g., bank group 299*a*, bank group 299*b*, . . . , bank group 299*d*, are optimized by the convolutional unit 220 performing its operation in a channel dimension, width dimension, and height dimension. Since the calculation order is in the same as the data storage order, no address jump on input channel dimension and width dimension is needed. As such, feature map data can be read from the virtual banks in a linear fashion and in long bursts. Moreover, in some embodiments, the convolutional unit 220 may be split into two sub-units, e.g., data fetch unit and calculation unit, where the data fetch is issued to the virtual banks before convolutional unit 220 consumes it, i.e. before the calculation unit needs it.

It is appreciated that random access to virtual banks from one or more ports may be inevitable for some unit, such as the element/pooling layer unit 240, resulting in performance degradation. Accordingly, those units such as element/pooling layer unit 240 are connected to AXI ports in the middle of the virtual banks. For example, the element/pooling layer unit 240 is connected to ports 271*g* and 271*k* in bank groups 299*b* and 299*c*, which are in the middle of the virtual banks 299*a*, . . . , 299*d*. Accordingly, the average latency is reduced. It is further appreciated that in some embodiments, AXI ID substitution and response reordering can be used to further improve memory access performance.

Figure 3:
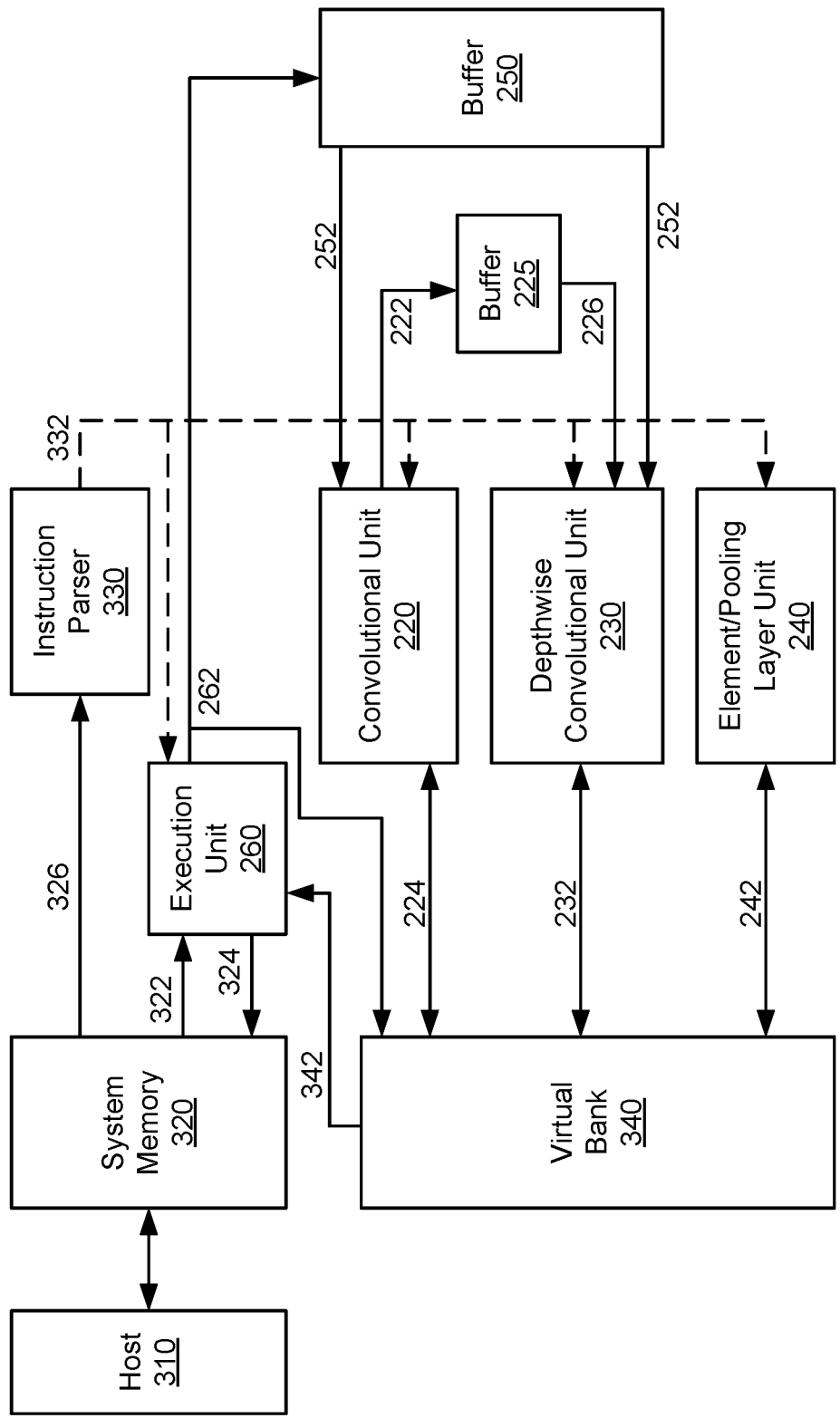
FIG. 3 shows a block diagram depicting data flow in a neural network accelerator, according to some examples.

Referring now to FIG. 3, a block diagram depicting data flow in a neural network accelerator, according to some examples is shown. A host 310 may send instructions and data, e.g., feature map data, bias data, etc., to the system memory 320. The system memory 320 may transmit the instruction 326 to the instruction parser 330 where the instruction is parsed and dispatched to all units of the neural network. For example, instruction 326 may be parsed into instruction 332 that is subsequently transmitted to the convolutional unit 220, the depthwise convolutional unit 230, the element/pooling layer unit 240, and execution unit 260, accordingly.

It is appreciated that in some embodiments, the instruction parser 330 may send a load instruction 332 to the execution unit 260 that causes data exchanges between the system memory 320 and the virtual bank 340, e.g., lower half of HBM 299. For example, weight and bias data received from the system memory 320 by the execution unit 260 may be stored 262 in the on-chip buffer 250, or feature map data may be stored 262 in the virtual bank 340. In contrast, a save instruction 332 may cause the execution unit 260 to receive the data 342 from the virtual bank 340 that is ultimately transmitted 324 to the system memory 320.

It is appreciated that the feature map data stored in the virtual bank 340 may be transmitted 224 to the convolutional unit 220 for processing and the processed feature map data may be transmitted back to the virtual bank 340 for storage. In some embodiments, the processed feature map data may be transmitted 222 to the on-chip buffer 225 such that it can be accessed 226 by the depthwise convolutional unit 230 for processing. The processed feature map data received by the depthwise convolutional unit 230 may be transmitted 232 for storage to the virtual bank 340. In some embodiments, the depthwise convolutional unit 230 may access 232 feature map data from the virtual bank 340 for processing and the processed result may be stored in the virtual bank 340 again. It is appreciated that in some embodiments, the element/pooling layer unit 240 may access 242 feature map data stored in the virtual bank 340, processes the feature map data and store 242 it back in the virtual bank 340.

It is appreciated that the bias and weight data stored in the buffer 250 may be transmitted 252 to the convolutional unit 220 and the depthwise convolutional unit 230, as needed. It is further appreciated that in some embodiments, the on-chip buffer 225 may receive feature map data or processed feature map data from the virtual bank 340 directly (not shown but as shown in FIG. 2).

Figure 4:
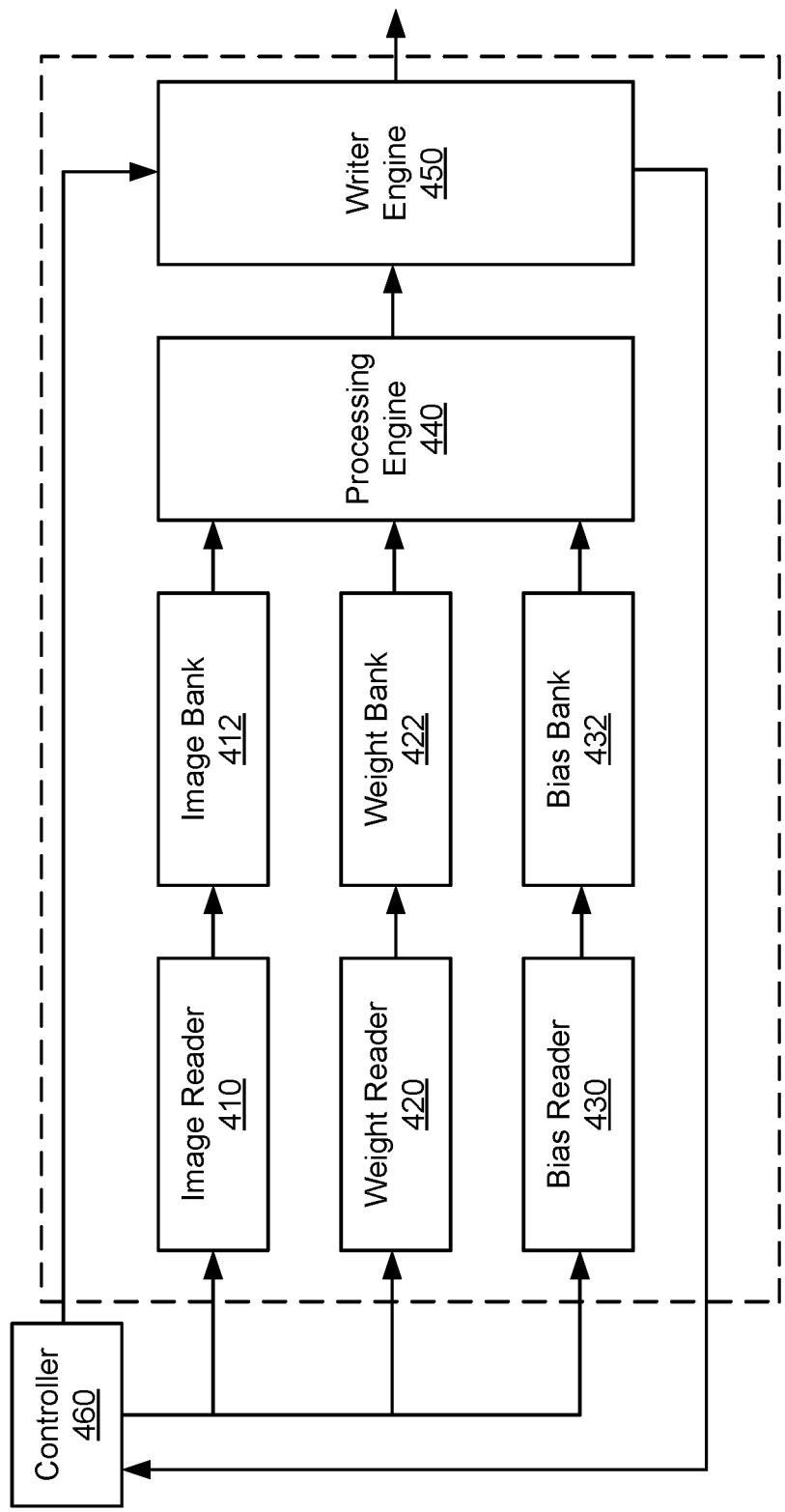
FIG. 4 shows a block diagram depicting an architecture for a depthwise convolutional unit, according to some examples.

Referring now to FIG. 4, a block diagram depicting an architecture for a depthwise convolutional unit, according to some examples is shown. It is appreciated that the depthwise convolutional unit 230 may include a controller 460, image reader 410, weight reader 420, bias reader 430, image bank 412, weight bank 422, bias bank 432, processing engine 440, and a writer engine 450. The controller 460 may receive instructions from the instruction fetch engine 210. The received instruction may be decoded into control parameters and the depthwise engine is triggered to start its operations.

The image reader 410 is configured to receive the parameters from the controller 460 and to generate read addressees for the image bank 412 in order to fetch the feature map data or the processed feature map data by the convolutional unit 220 from the virtual banks. It is appreciated that the image reader 410 may also control the passing operation of the image.

The weight reader 420 is configured to receive the parameters from the controller 460 along with triggers. The weight reader 420 is further configured to generate read address for the weight bank 422 in order to read out the weight parameters, e.g., from the on-chip buffer 250.

In some embodiments, the bias reader 430 is configured to receive the parameters and triggers from the controller 460. The bias reader 430 is further configured to generate read address for the bias banks to fetch the bias parameters, e.g., from the on-chip buffer 250.

It is appreciated that in some embodiments, the processing engine (PE) 440 is configured to perform all calculations of the depthwise convolutional unit 230, e.g., multiply, add, accumulation, non-linear process, etc. The writer engine 450 is configured to receive the parameters and triggers from the controller 460 and to generate HBM write addresses for the processed data being output by the PE 440. The writer engine 450 subsequently loads the processed data that is received from the PE 440 into the generated address for the HBM. It is appreciated that in some embodiments, the writer engine 450 may output a trigger signal to the controller 460 when the write data buffer exceeds a certain threshold in order to avoid write data buffer overflow. In response to the trigger signal, the controller 460 may halt the operation until the write data buffer goes below the certain threshold.

Figure 5:
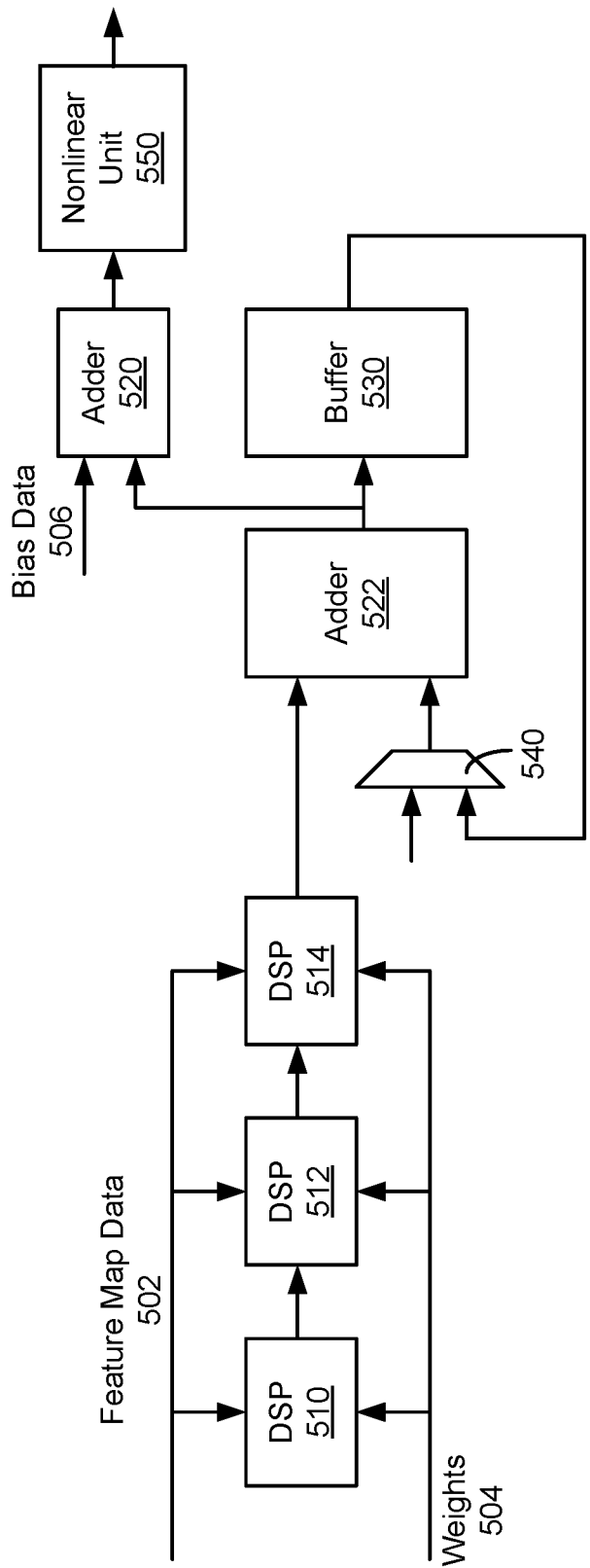
FIG. 5 shows a block diagram depicting a processing engine of a depthwise convolutional unit, according to some examples.

Referring now to FIG. 5, a block diagram depicting a processing engine of a depthwise convolutional unit, according to some examples is shown. It is appreciated that the parallelism of the depthwise engine is 4×63×3, as described above. Accordingly, the PE 440 includes 128 unit as shown in FIG. 5. Each unit includes DSPs 510, 512, 514, adders 522, 520, a buffer 530, a nonlinear unit 550, and a multiplexer 540. As discussed above, one DSP width is large enough to process two pixels at the same time. As such, the DSPs 510-514 can process 6 pixels at the same time if the stride on width dimension is 1. In contrast, the DSPs 510-514 can process 4 pixels at the same time if the stride on width dimension is 2. It is appreciated that since most depthwise layers' stride is 1, the three DSP structures 510-514 provide parallelism of 3 on width dimension and 2 on height dimension.

It is appreciated that in a dedicated 3×3 kernel size, every output of the last DSP 514 is ⅓ of the last result, called a partial sum and stored in the buffer 530, and accumulated over time using the adder 522 until the last ⅓ result is received and added. It is appreciated that the feature map data 502 is read, e.g., from the virtual bank or on-chip buffer 225, and received by DSPs 510-514. Moreover, DSPs 510-514 receive the weights 504, e.g., stored in on-chip buffer 250. The last DSP 514 outputs a partial result to the adder 522. The adder 522 also receives a previously stored partial value in the buffer 530. However, initially the value is 0 which is added to the partial sum received from the DSP 514. The adder 522 outputs the partial sum and stores it in the buffer 530. In the next iteration, the buffer 530 output the previously stored partial sum to the multiplexer 540 which outputs it to the adder 522. The adder 522 also receives the next partial sum from the last DSP 514. The adder 522 adds the first partial sum to the second partial sum and stores it in the buffer 530. The process is repeated until the final result is output. In this embodiment, each time ⅓ of the result is produced and therefore after three times the final result is generated. It is appreciated that in some embodiments, the adder 522 outputs the final result to adder 520 which also receives the bias data 506, e.g., from the on-chip buffer 250. The adder 520 outputs the result to the nonlinear unit 550 for nonlinear operations, e.g., relu, leaky relu, etc.

It is appreciated that the depth of the buffer 530 depends on the process length of the width dimension. As described above, since the feature map data is stored in the virtual bank, there are enough SRAM resources and the buffer 530 has 1024 entries, which is equivalent to the depth of an FPGA block RAM. It is appreciated that since the width of most depthwise layers' input feature map data is less than 1024, the entire line can be processed in one iteration. It is appreciated that since the depth of the buffer 530 is limited, the calculation order of depthwise layer is in width dimension, height dimension, and channel dimension order. As such, one line of the partial sum of one channel is stored in each buffer 530. It is appreciated that for each row of the feature map data 502, the weights 504 are only read once and the PE unit executes in weights stationary style without having to reach them in each cycle.

Accordingly, capacity limitations associated with memories in neural networks is addressed while reducing latency and increasing bandwidth. Moreover, using a dedicated depthwise convolutional unit decreases the computation and accelerates the depthwise layer processing with minimal impact on resource utilization. Use of the HBM increases capacity and bandwidth. The storage of feature map data is in dedicated virtual banks of the HBM while weight data, bias data, and instructions are stored on on-chip memory resulting in reduced numbers of data movement between memory banks, reduced latency, increased bandwidth.

Moreover, use of an on-chip buffer to communicate data between a convolutional unit and a depthwise convolutional unit reduces the cost associated with data movement even lower. Accordingly, large neural network data can be processed with very low latency and use of a dedicated depthwise engine with only a few DSPs matches the throughput of the convolutional unit.

Figure 6:
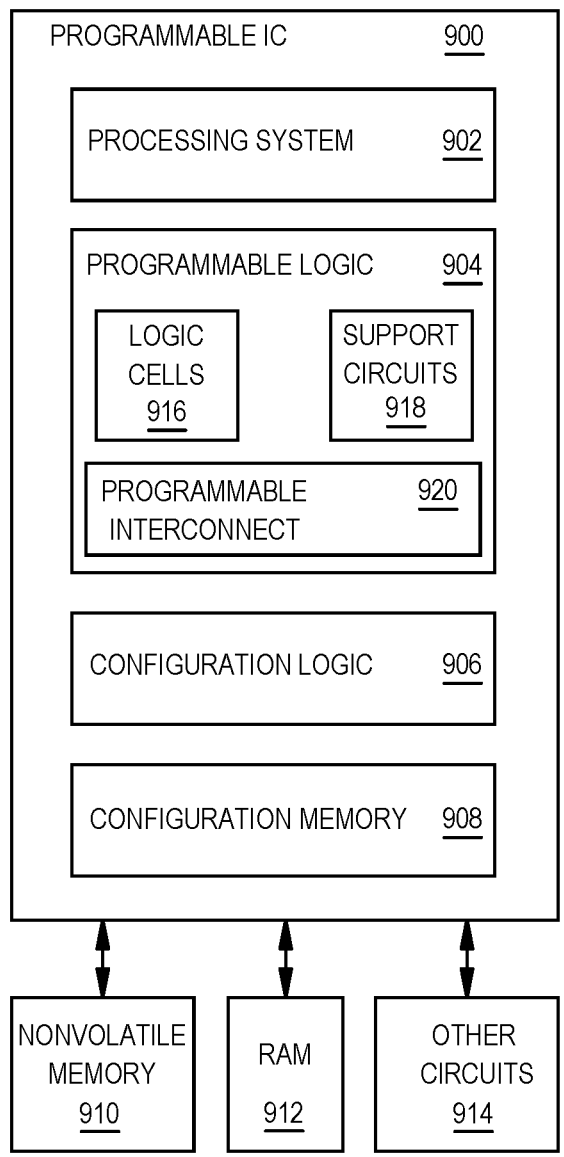
FIG. 6 is a block diagram depicting a programmable integrated circuit (IC), according to some examples.

FIG. 6 is a block diagram depicting a programmable integrated circuit (IC) 900 according to an example. The programmable IC 900 can implement the integrated circuit (IC) chip of systems of FIGS. 1-5, in whole or in part. The programmable IC 900 includes a processing system 902, programmable logic 904, configuration logic 906, and configuration memory 908. The programmable IC 900 can be coupled to external circuits, such as nonvolatile memory 910, RAM 912, and other circuits 914.

In the example of FIG. 6, the processing system 902 can include microprocessor(s), memory, support circuits, IO circuits, and the like. The programmable logic 904 includes logic cells 916, support circuits 918, and programmable interconnect 920. The logic cells 916 include circuits that can be configured to implement general logic functions of a plurality of inputs. The support circuits 918 include dedicated circuits, such as transceivers, input/output blocks, digital signal processors, memories, and the like. The logic cells and the support circuits 918 can be interconnected using the programmable interconnect 920. Information for programming the logic cells 916, for setting parameters of the support circuits 918, and for programming the programmable interconnect 920 is stored in the configuration memory 908 by the configuration logic 906. The configuration logic 906 can obtain the configuration data from the nonvolatile memory 910 or any other source (e.g., the RAM 912 or from the other circuits 914).

Figure 7:
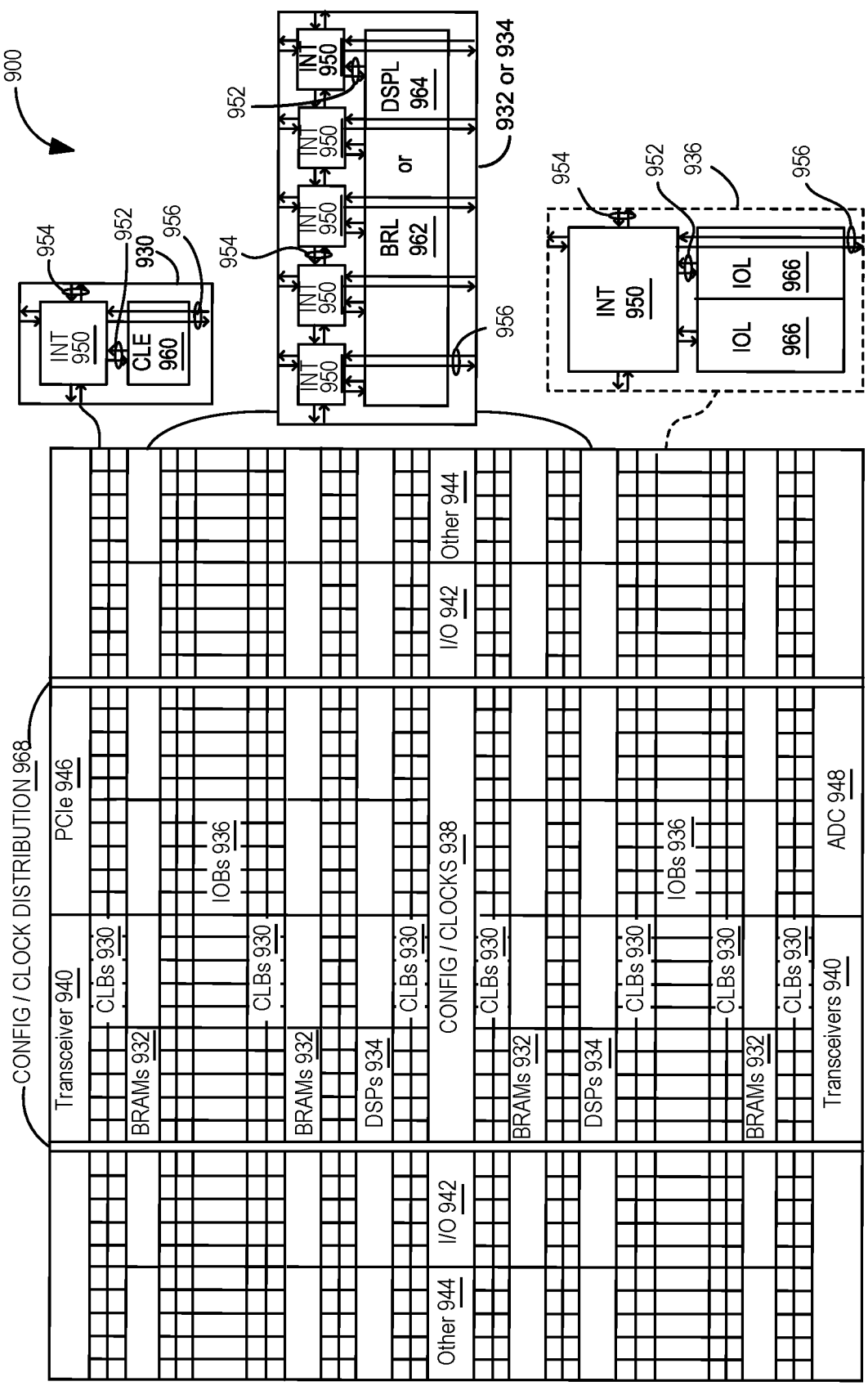
FIG. 7 is a field programmable gate array (FPGA) implementation of the programmable IC, according to some examples.

FIG. 7 illustrates an FPGA implementation of the programmable IC 900 that includes a large number of different programmable tiles including configurable logic blocks ("CLBs") 930, random access memory blocks ("BRAMs") 932, signal processing blocks ("DSPs") 934, input/output blocks ("IOBs") 936, configuration and clocking logic ("CONFIG/CLOCKS") 938, digital transceivers 940, specialized input/output blocks ("I/O") 942 (e.g., configuration ports and clock ports), and other programmable logic 944 such as digital clock managers, system monitoring logic, and so forth. The FPGA can also include PCIe interfaces 946, analog-to-digital converters (ADC) 948, and the like.

In some FPGAs, each programmable tile can include at least one programmable interconnect element ("INT") 950 having connections to input and output terminals 952 of a programmable logic element within the same tile, as shown by examples included in FIG. 6. Each programmable interconnect element 950 can also include connections to interconnect segments 954 of adjacent programmable interconnect element(s) in the same tile or other tile(s). Each programmable interconnect element 950 can also include connections to interconnect segments 956 of general routing resources between logic blocks (not shown). The general routing resources can include routing channels between logic blocks (not shown) comprising tracks of interconnect segments (e.g., interconnect segments 956) and switch blocks (not shown) for connecting interconnect segments. The interconnect segments of the general routing resources (e.g., interconnect segments 956) can span one or more logic blocks. The programmable interconnect elements 950 taken together with the general routing resources implement a programmable interconnect structure ("programmable interconnect") for the illustrated FPGA.

In an example implementation, a CLB 930 can include a configurable logic element ("CLE") 960 that can be programmed to implement user logic plus a single programmable interconnect element ("INT") 950. A BRAM 932 can include a BRAM logic element ("BRL") 962 in addition to one or more programmable interconnect elements. Typically, the number of interconnect elements included in a tile depends on the height of the tile. In the pictured example, a BRAM tile has the same height as five CLBs, but other numbers (e.g., four) can also be used. A signal processing block 934 can include a DSP logic element ("DSPL") 964 in addition to an appropriate number of programmable interconnect elements. An IOB 936 can include, for example, two instances of an input/output logic element ("IOL") 966 in addition to one instance of the programmable interconnect element 950. As will be clear to those of skill in the art, the actual I/O pads connected, for example, to the input/output logic element 966 typically are not confined to the area of the input/output logic element 966.

In the pictured example, a horizontal area near the center of the die is used for configuration, clock, and other control logic. Vertical columns 968 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A system comprising:
a high bandwidth memory (HBM) device comprising random access memory (RAM) distributed over multiple dies that are arranged in a stacked configuration, a first portion of the RAM is configured as virtual banks of RAM dedicated to storing feature map data of a convolutional neural network (CNN) application program, and wherein a second portion of the RAM is dedicated to supporting data exchanges with a host;
a CNN engine comprising:
a convolutional instruction processor configured to execute convolutional layer instructions of the CNN application program; and
a depthwise convolutional instruction processor configured to execute depthwise layer instructions of the CNN application program; and
point-to-point interface circuitry configured to permit the convolutional instruction processor and the depthwise convolutional instruction processor to access respective first and second sets of the virtual banks of the RAM;
wherein the convolutional instruction processor and the depthwise convolutional instruction processor are further configured to write and read feature map data of the CNN application program to and from the respective first and second sets of the virtual banks of RAM via the point-to-point interface circuitry.

2. The system of claim 1, further comprising switch circuitry configured to provide interleaved access to the virtual banks of RAM based on an access sequence of the CNN application program.

3. The system of claim 1, further comprising a buffer circuit, wherein:
the convolutional instruction processor is further configured to write processed feature map data to the buffer circuit; and
the depthwise convolutional instruction processor is further configured to receive the processed feature map data from the buffer circuit.

4. The system of claim 3, wherein:
the point-to-point interface circuitry is further configured permit the buffer circuit to access a third set of the virtual banks of RAM; and
the buffer circuit is further configured to receive the feature map data of the CNN application program from the third set of virtual banks of RAM via the point-to-point interface circuitry; and
the depthwise convolutional instruction processor is further configured to receive the feature map data of the CNN application program from the buffer circuit.

5. The system of claim 3, further comprising an additional die that comprises the CNN engine and the buffer circuit.

6. The system of claim 1, further comprising an additional die that comprises the CNN engine and a buffer circuit configured to store weights and bias data of the CNN application program, wherein the convolutional instruction processor and the depthwise convolutional instruction processor are further configured to receive the weights and bias data from the buffer circuit.

7. The system of claim 1, further comprising:
an element/pooling layer instruction processor configured to calculate element-wise layers and pooling layers of the CNN application program,
wherein the point-to-point interface circuitry is further configured permit the element/pooling layer instruction processor to access a third set of the virtual banks of RAM.

8. The system of claim 1, wherein the convolutional instruction processor comprises a data fetch instruction processor and a calculation instruction processor, and wherein the data fetch instructions processor receive instructions prior to the calculation instruction processor.

9. The system of claim 1, wherein the feature map data is arranged in channel dimension, width dimension, and height dimension in the virtual banks of RAM, and wherein the convolutional instruction processor is configured to calculate in channel dimension, width dimension, and height dimension order.

10. The system of claim 1, wherein a height dimension associated with the convolutional instruction processor is the same as a height dimension associated with the depthwise convolutional instruction processor, and wherein an output channel dimension associated with the convolutional instruction processor is the same as an input/output dimension associated with the depthwise convolutional instruction processor.

11. The system of claim 1, wherein
the convolutional instruction processor comprises multiple convolutional instruction processors;
the depthwise convolutional instruction processor comprises multiple depthwise convolutional instruction processors; and
parallelism between the convolutional instruction processors and the depthwise convolutional instruction processors is selected to match a bandwidth of the HBM device and to match processing resources of the system.

12. The system of claim 1, wherein the convolutional instruction processor and the depthwise convolutional instruction processor are implemented in one of an application-specific integrated circuit (ASIC) and a field programmable gate array (FPGA).

13. A system comprising:
a high bandwidth memory (HBM) device comprising random access memory (RAM) distributed over multiple dies that are arranged in a stacked configuration, wherein a first portion of the RAM is configured as virtual banks of RAM dedicated to storing feature map data of a convolutional neural network (CNN) application program, and wherein a second portion of the RAM is dedicated to supporting data exchanges with a host; and
a convolutional neural network (CNN) engine comprising:
a convolutional unit comprising convolutional instruction processors configured to execute convolutional layer instructions of the CNN application program;
a depthwise convolutional unit comprising a processing engine that comprises a plurality of cascaded depthwise convolutional instruction processors configured to execute depthwise layer instructions of the CNN application program, including to operate on respective portions of the feature map data based on respective weight data and respective bias data of the CNN application program, in a cascade fashion, wherein one of the cascaded depthwise convolutional instruction processors is further configured to output a partial result; and
a buffer circuit configured to provide the feature map data from one or more of the convolutional unit and the virtual banks of RAM to the depthwise convolutional unit.

14. The system of claim 13, wherein the writer engine is further configured to output a signal to the controller when contents of a buffer within the writer engine meets a threshold.

15. The system of claim 13, wherein the processing engine further comprises:
a first adder configured to determine a sum of the partial result and a prior partial result; and
a buffer configured to store the sum and to provide the sum to the first adder for a subsequent iteration.

16. The system of claim 15, wherein the processing engine further comprises a second adder configured to receive bias data and a final result of the cascaded depthwise convolutional instruction processors.

17. The system of claim 16, wherein the processing engine further comprises nonlinear circuitry configured to receive the final result from the second adder and perform nonlinear operations on the final result.

18. The system of claim 17, wherein the nonlinear circuitry is further configured to perform one or more of a rectified linear unit (ReLU) operation and a leaky ReLu operation on the final result.

19. The system of claim 13, wherein the processing engine is configured to perform calculations in width dimension, height dimension, and channel dimension order.

* * * * *